(12) United States Patent
Xu et al.

(10) Patent No.: US 10,607,160 B2
(45) Date of Patent: *Mar. 31, 2020

(54) UNIQUE ACCOMMODATION SEARCH IMPROVEMENT FOUNDED IN LISTING BOOKING CONVERSION

(71) Applicant: Airbnb, Inc., San Francisco, CA (US)

(72) Inventors: Tao Xu, Palo Alto, CA (US); Bar Ifrach, San Francisco, CA (US); Spencer de Mars, San Francisco, CA (US); Maxim Charkov, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/452,307

(22) Filed: Mar. 7, 2017

(65) Prior Publication Data

US 2017/0178036 A1      Jun. 22, 2017

Related U.S. Application Data

(63) Continuation-in-part of application No. 14/505,455, filed on Oct. 2, 2014.

(51) Int. Cl.
*G06Q 10/02* (2012.01)
*G06F 17/18* (2006.01)
(Continued)

(52) U.S. Cl.
CPC ......... *G06Q 10/02* (2013.01); *G06F 16/9535* (2019.01); *G06F 17/18* (2013.01);
(Continued)

(58) Field of Classification Search
CPC .................. G06Q 10/02; G06F 17/18
(Continued)

(56) References Cited

U.S. PATENT DOCUMENTS

| 9,020,936 B2 | 4/2015 | Svore et al. |
| 2003/0220773 A1* | 11/2003 | Haas ................. G06Q 10/0637 703/2 |

(Continued)

FOREIGN PATENT DOCUMENTS

JP        2004/094809 A        3/2004

OTHER PUBLICATIONS

Online Price Competition within and between Heterogeneous Retailer Groups (Year: 2004).*

(Continued)

*Primary Examiner* — Jeff Zimmerman
*Assistant Examiner* — Zeina Elchanti
(74) *Attorney, Agent, or Firm* — Fenwick & West LLP

(57) ABSTRACT

Methods and systems for machine learning assisted search functions for unique accommodations founded in listing booking conversion are disclosed. In one embodiment, an online booking system models the conversion propensity of listings based on statistical relationships between features of previously received accommodation reservation requests and the booking of those reservation requests by guests. In particular, the system classifies reservation requests based on several features—a reservation request either possesses a feature or does not possess a feature. The conversion propensity of a listing for a particular request feature is modeled based on the relationship between the reservation requests that possess the feature and the reservation requests that are booked by a guest.

19 Claims, 9 Drawing Sheets

(51) Int. Cl.
  *G06Q 50/12* (2012.01)
  *G06N 20/00* (2019.01)
  *G06F 16/9535* (2019.01)
  *G06Q 50/16* (2012.01)
  *G06Q 50/14* (2012.01)

(52) U.S. Cl.
  CPC ............ *G06N 20/00* (2019.01); *G06Q 50/12* (2013.01); *G06Q 50/14* (2013.01); *G06Q 50/163* (2013.01)

(58) Field of Classification Search
  USPC .......................................................... 705/5
  See application file for complete search history.

(56) References Cited

U.S. PATENT DOCUMENTS

| | | | |
|---|---|---|---|
| 2007/0067193 A1 | 3/2007 | Robertson | |
| 2010/0198628 A1 | 8/2010 | Rayner | |
| 2010/0262440 A1* | 10/2010 | Ulring | G06Q 10/02 705/5 |
| 2010/0293011 A1* | 11/2010 | Lebreton | G06Q 10/00 705/5 |
| 2011/0106583 A1* | 5/2011 | Rozell | G06Q 10/02 705/7.29 |
| 2013/0031506 A1 | 1/2013 | Diaz et al. | |
| 2014/0156183 A1 | 6/2014 | Windeler et al. | |
| 2014/0278591 A1 | 9/2014 | Blecharczyk et al. | |
| 2017/0116548 A1* | 4/2017 | Ito | G06Q 10/02 |

OTHER PUBLICATIONS

Canadian First Office Action, Canadian Application No. 2,963,082, dated Feb. 15, 2018, 5 pages.
United States Office Action, U.S. Appl. No. 14/505,455, dated Mar. 9, 2018, 39 pages.
United States Office Action, U.S. Appl. No. 14/505,455, dated Nov. 3, 2017, 34 pages.
PCT International Search Report and Written Opinion, PCT Application No. PCT/US2015/039218, dated Sep. 7, 2015, 11 pages.
United States Office Action, U.S. Appl. No. 14/505,455, dated May 3, 2017, 24 pages.
Kocas, C. "Online Price Competition within and between Heterogeneous Retailer Groups," 37$^{th}$ Annual Hawaii International Conference on System Sciences, 2004, IEEE, 10 pages.
Canadian Patent Office, Canadian Patent Application No. 2,963,082, Jan. 3, 2019, 6 pages.
Drosou, M. et al., "Search Result Diversification," ACM SIGMOD Record, Mar. 2010, vol. 39, No. 1, pp. 41-47.
PCT International Search Report and Written Opinion, PCT Application No. PCT/US2015/026474, dated Jul. 1, 2015, 14 pages.
Tang, J. et al., "Evaluation and User Preference Study on Spatial Diversity," Advances in Information Retrieval, Springer Berlin Heidelberg, Mar. 28, 2010, 12 pages.
United States Office Action, U.S. Appl. No. 14/505,455, dated Aug. 7, 2018, 36 pages.
United States Office Action, U.S. Appl. No. 16/358,393, dated Aug. 23, 2019, 28 pages.

* cited by examiner

| Listing | Count | Books | Rejections |
|---|---|---|---|
| Listing 1 | 1123 | 0 | 157 |
| Listing 2 | 959 | 5 | 781 |
| Listing 3 | 795 | 0 | 47 |
| Listing 4 | 705 | 0 | 89 |
| Listing 5 | 659 | 29 | 349 |
| Listing 6 | 641 | 29 | 118 |
| Listing 7 | 621 | 27 | 243 |
| Listing 8 | 596 | 48 | 249 |
| Listing 9 | 589 | 9 | 90 |
| Listing 10 | 547 | 2 | 517 |
| Listing 11 | 530 | 0 | 335 |
| Listing 12 | 514 | 2 | 53 |
| Listing 13 | 501 | 4 | 91 |
| Listing 14 | 498 | 1 | 313 |
| Listing 15 | 491 | 9 | 458 |

FIG. 1A

UNIQUE ACCOMMODATION SEARCH IMPROVEMENT FOUNDED IN LISTING BOOKING CONVERSION

RELATED APPLICATIONS

This application is a continuation-in-part of, and claims priority to, U.S. patent application Ser. No. 14/505,455 titled "DETERMINING HOST PREFERENCES FOR ACCOMMODATION LISTINGS" and filed on Oct. 2, 2014, the entirety of which is hereby incorporated by reference.

TECHNICAL FIELD

This invention relates to machine learning assisted search functions and in particular to modeling listing behavior to improve search results based on unique accommodation listing responses to reservation requests.

BACKGROUND

Online booking systems match guests looking for short term accommodation with a listing for accommodations offered by a host. After locating a desired listing, guests contact hosts with inquiries and/or requests to book the desired listing. Guests have certain preferences that impact whether they will move forward to booking after an inquiry or request to book. Similarly, hosts typically have certain preferences that impact whether a particular request for an accommodation is accepted or rejected by them. Such preferences may be explicitly provided by the guests and hosts. Most often, however, the preferences are implicit and dependent upon several variables that are not easily quantifiable. Therefore, it can be difficult to determine whether a particular inquiry for a reservation will result in a booking (i.e., inquiry accepted by the host and then the listing booked by the guest).

SUMMARY

An online booking system models booking conversion for listings based on statistical relationships between features of previously received reservation requests or inquiries, acceptance of those reservation requests by the hosts, and booking by guests. In particular, the system classifies reservation requests based on a set of features. The booking conversion propensity for a listing and a particular request feature is modeled based on the relationship between the reservation requests that possess the feature and the reservation requests that are accepted by the host and booked by guests. The system uses the booking conversion model for a given listing to determine a probability that a prospective reservation request for the listing will be accepted by the host and booked by a guest. The probability is used to generate search results by filtering listing search results where the prospective reservation request has a probability of being booked that is below a threshold determined by a threshold function. Thereafter, information may be provided to the host of a listing when a prospective reservation request has a booking conversion rate is below the threshold to provide guidance to the host on how the host can improve the listing.

In some cases, sufficient listing-specific historical data needed to generate an accurate booking conversion model is not available. To address this insufficiency of data, the conversion model is generated based on historical data for a given listing in combination with historical data for other listings in the same region. In other cases, a listing has sufficient historical data to determine a significant low booking conversion rate for a listing. In these cases, the probability of booking is a function of the booking conversion rate and is used to generate search results by filtering listing search results where the prospective reservation request has a booking conversion rate is below a threshold determined by a threshold function.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 1A is a table of experimental results of listings with low conversion rates.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

U.S. patent application Ser. No. 14/505,455 titled "Determining Host Preferences for Accommodation Listings," discloses an online booking system that models the preferences of hosts based on statistical relationships between features of previously received reservation requests and the acceptance of those reservation requests by the hosts. Experimenting with the disclosed system for lowering the presentation rank of search results (where the prospective reservation request has a low probability of being accepted by the host) revealed that there is a subset of (or a category of) listings which receive a significant number of inquiries and/or requests to book, but which result in few bookings. These listings have a low booking-to-inquiry ratio either because the guest did not move forward to booking or because the host rejected the inquiry.

Investigation revealed various aspects of the unique accommodation listing market result in this peculiar behavior. First, the listings are distinctive. Other types of searches (e.g., for a hotel room or for a consumer product) yield results that are equivalent or fungible. Indeed, often the results are nearly identical, only differing in terms such as price or shipping. Further, because the searches are for inventory supplied in large quantities, searches often result in so many results the searcher cannot practically review all the search results. This is not the case with unique accommodation listings. Guests have a strong desire to find the best accommodation for their needs and—because the search results are limited—will often review all of the accommodation search results. Accordingly, even if a listing is near the end of the search results, a guest will often see the listing. When a guest encounters a listing that looks appealing, the guest may become emotionally invested in the listing. That emotional investment coupled with the time investment spent searching for a listing and reviewing the search results may lead to a negative experience for the guest if an inquiry does not lead to booking.

Figure 1B:
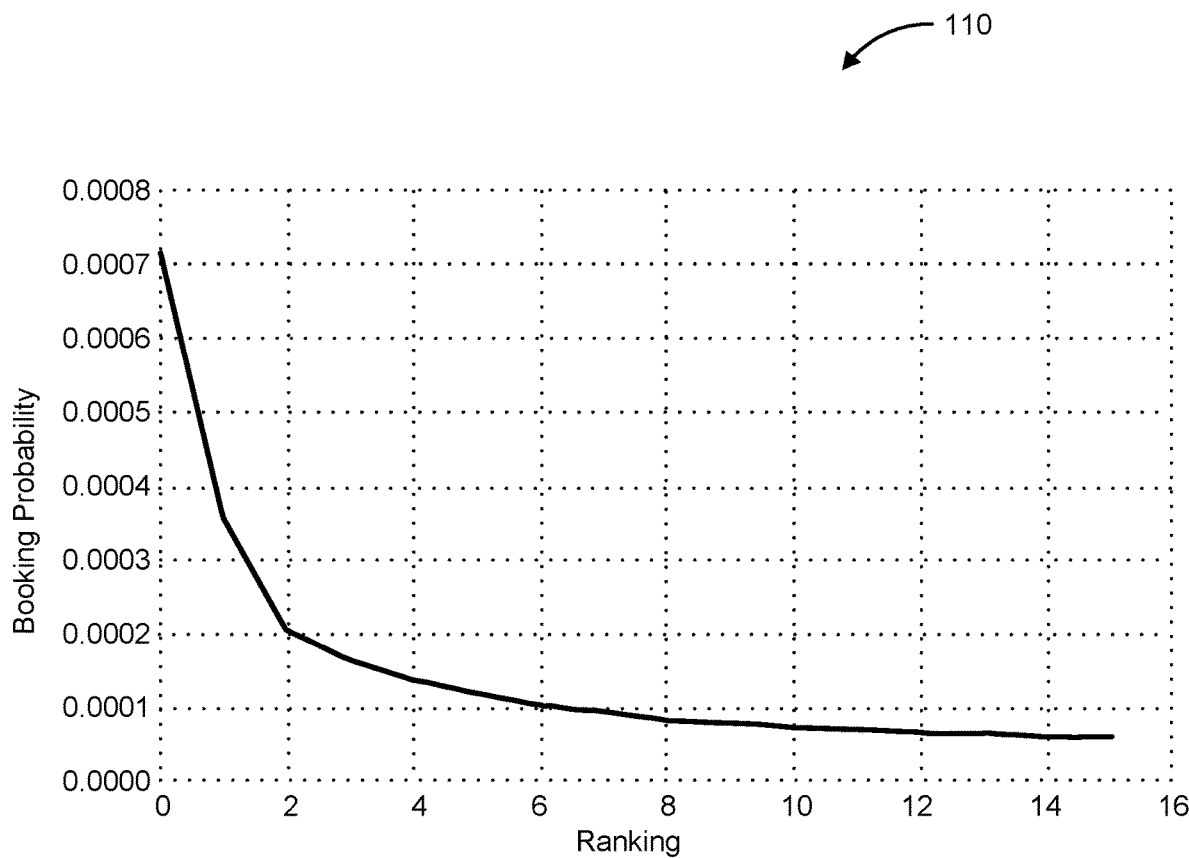
FIG. 1B is a position-weighted booking probability curve showing the range of the booking probability against listing search ranking

FIG. 1A is a table 100 of experimental results of listings with low conversion rates. A first step in the booking process is a contact request from the potential guest to the host through the contact channels available to the potential guest. Two available guest-to-listing-host contact channels are (1) contact host and (2) request to book. As used herein, inquiries and reservation requests include the available guest-to-listing-host contact channels including contacts and requests to book. The table 100 shows listings with a significantly (1) low conversion of inquiry (via the contact host channel) to book rate or (2) high host rejection rate (via the request to book channel). The table shows the listing number, the count of the number of inquiries for the listing, the number of books resulting from the inquiries, and the number of rejections (rejection of a request to book the listing). The results show that many of the listings with large numbers of inquiries have very low conversion to book rates (and often very high rejection rates). These listings may cause problems for prospective guests. The listings receive many inquiries and requests to book, even though listings are not genuinely available or are not in-fact attractive listings for guests to book. These types of listings may result in a bad user experience for those guests who made the inquiries: the guests spent time searching for a listing and found a listing that appears appealing only to have the inquiry not lead to booking. Thereafter, the guests may be less likely to continue searching for another listing to book.

What is more, it was found that ranking demotion alone is ineffective in increasing the low conversion to book rate. Experimental results demonstrate that the ability to leverage ranking changes in order to alter the probability of being booked can be very limited. Specifically, demotion in the long tail is largely ineffectual. This can be seen in the position-weighted booking probability curve shown in FIG. 1B. As can be seen, the range of the booking probability on the ordinate is small. This means that even large changes in ranking (shown on the abscissa) only create small changes in the probability of a listing being booked. Similarly, large changes in ranking result in small changes in the probability of reservation request or inquiries. In addition, the shape of the curve indicates that most of the change in booking probability will come from changes for relatively highly ranked listings. Accordingly, demotion in the long tail is likely ineffectual.

System Overview

Figure 2:
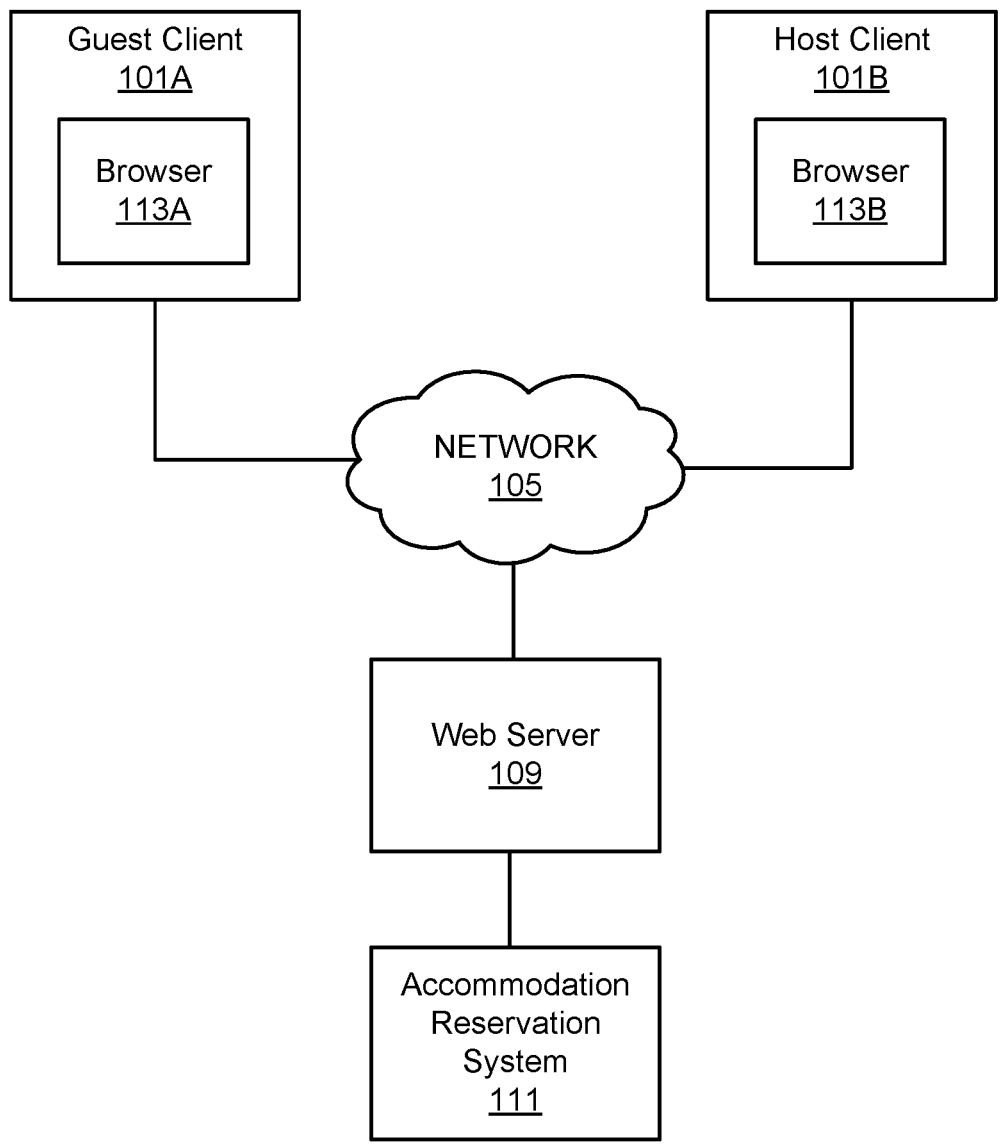
FIG. 2 is a system diagram of the online booking system in accordance with one embodiment.

FIG. 2 is a system diagram of the online booking system in accordance with one embodiment. FIG. 2 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 101 are used by the users 103 for interacting with the online booking system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The client device 101 executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online booking system 111. In other embodiments, the client device 101 may execute a dedicated application for accessing the online booking system 111.

The online booking system 111 includes web server 109 that presents web pages or other web content that form the basic interface visible to the users 103. Users 103 use respective client devices 101 to access one or more web pages, and provide data to the online booking system 111 via the interface.

The online booking system 111 may be, for example, an online booking system, a dining reservation system, a rideshare reservation system, a retail system, and the like. More generally, the online booking system 111 provides users with access to an inventory of resources (e.g. goods and services) that are available to consumers. The real world, physical location of each resource is considered as a factor in the consumer's decision to consume (e.g., purchase, rent, or otherwise obtain) the resource. Other factors include the listing type, the identity of the listing owner, and reviews of users' who have previously used the service offered by the listing.

In some embodiments, the online booking system 111 facilitates transactions between users 103. For example, an online booking system allows users 103 to book accommodations provided by other users of the online booking system. A rideshare reservation system allows users 103 to book rides from one location to another. An online marketplace system allows users 103 to buy and/or sell goods or services face to face with other users. The online booking system 111 comprises additional components and modules that are described below.

Online Booking System

Figure 3A:
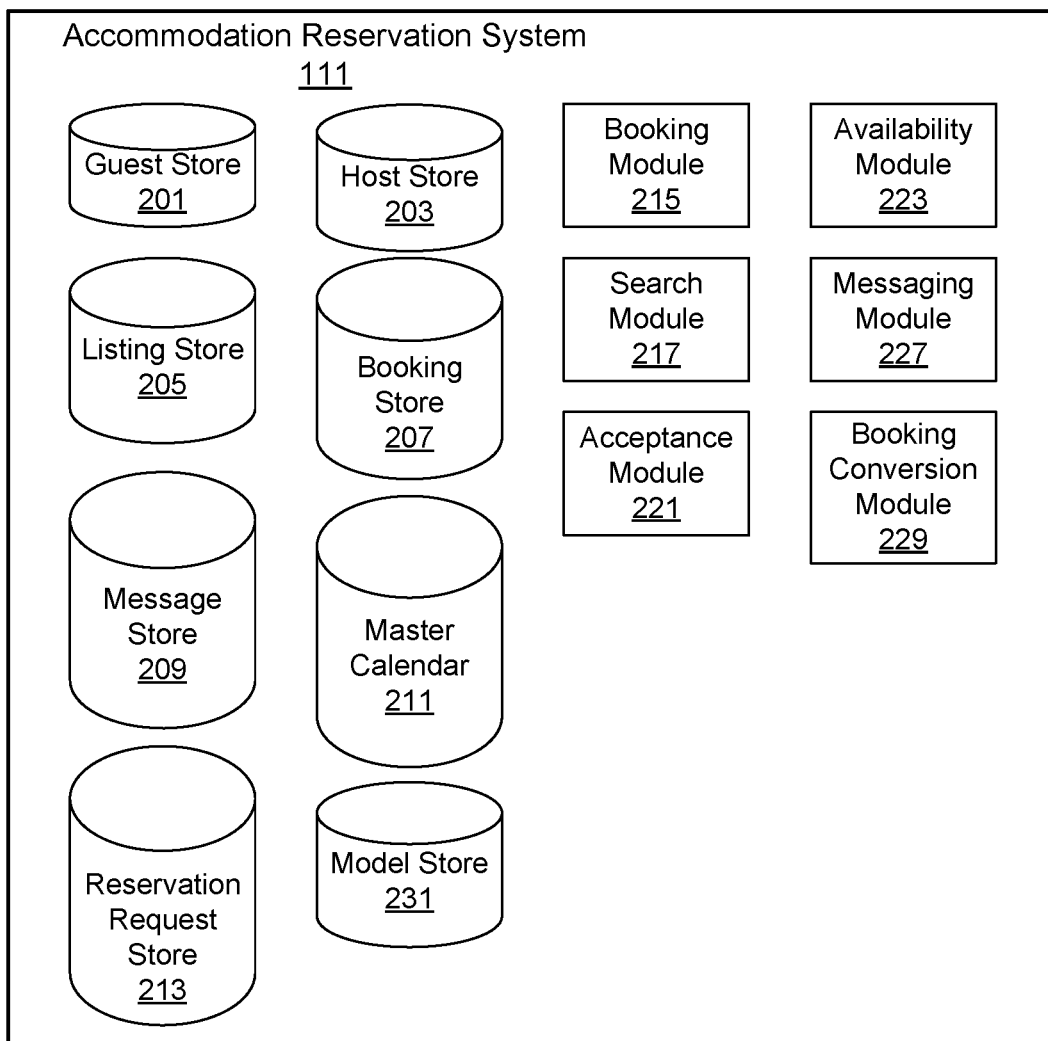
FIG. 3A is a block diagram illustrating the different modules and stores included in the online booking system in accordance with one embodiment.
Figure 3B:
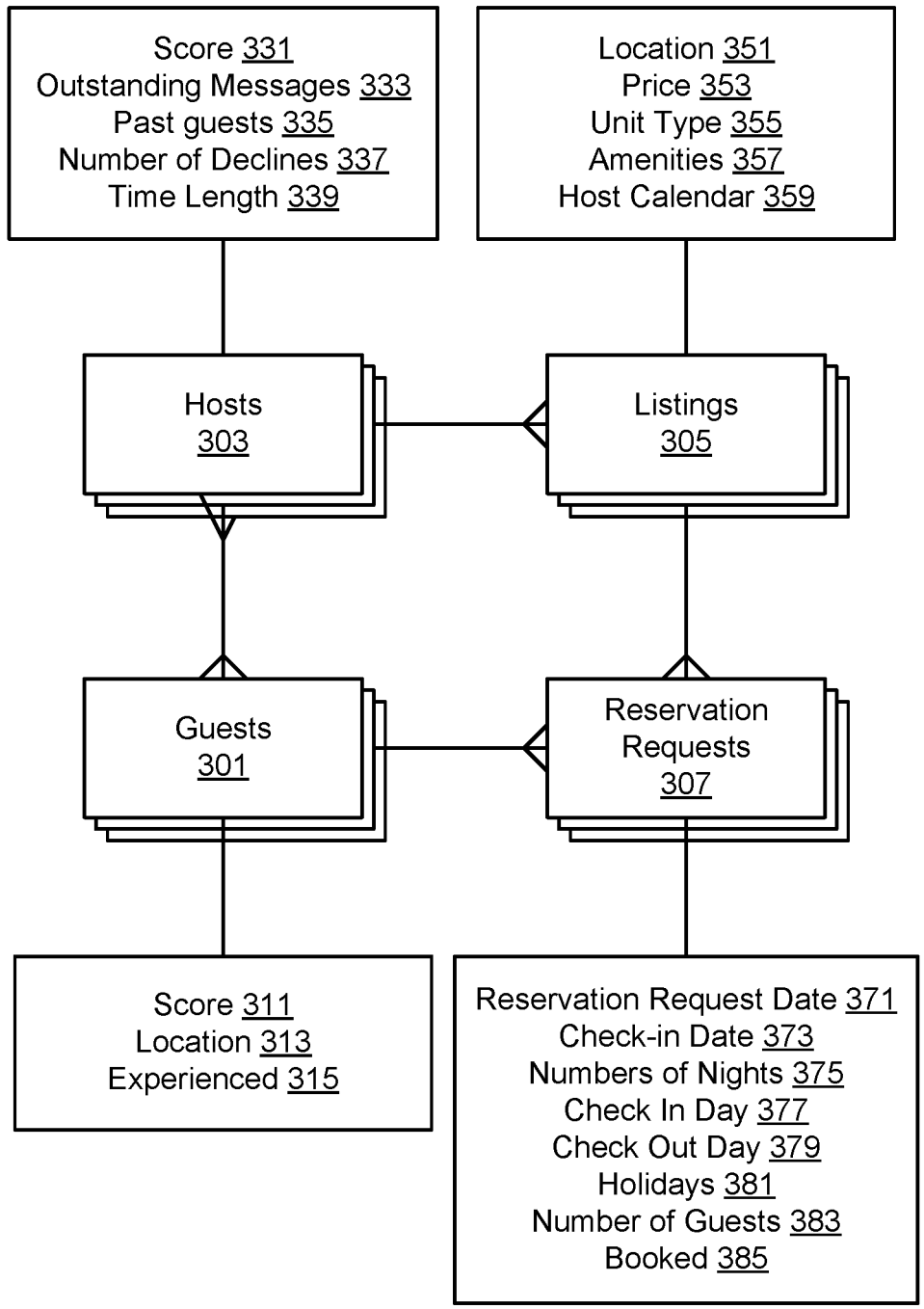
FIG. 3B is an illustration of the class diagram of the online booking system in accordance with one embodiment.

Referring to FIG. 3A and FIG. 3B, in one embodiment the online booking system 111 comprises a guest store 201, a host store 203, a listing store 205, reservation request store 213, a booking store 207, a message store 209, a calendar 211, a booking module 215, a search module 217, an acceptance module 221, an availability module 223, and a messaging module 227. Those of skill in the art will appreciate that the online booking system 111 may contain other modules that are not described herein. In addition, conventional elements, such as firewalls, authentication systems, payment processing systems, network management tools, load balancers, and so forth are not shown as they are not material to the invention.

The system 111 may be implemented using a single computer, or a network of computers, including cloud-based computer implementations. The computers are preferably server class computers including one or more high-performance CPUs and 1G or more of main memory, and running an operating system such as LINUX or variants thereof. The operations of the system 111 as described herein can be controlled through either hardware or through computer programs installed in non-transitory computer storage and executed by the processors to perform the functions described herein. The various stores (e.g., guest store 201, host store 203, etc.) are implemented using non-transitory computer readable storage devices, and suitable database management systems for data access and retrieval. The system 111 includes other hardware elements necessary for the operations described here, including network interfaces and protocols, input devices for data entry, and output devices for display, printing, or other presentations of data.

The guest store 201 persistently stores data describing users (i.e., guests) that inquire about listings for accommodation in the online booking system 111, and is one means for performing this function. Each guest is represented by a guest object 301, which may also be called a guest profile. The guest object 301 stores a unique identifier associated with a given guest and information about the guest. The information may include personal information such as name, user name, email address, location, phone number, gender, date of birth, personal description, education, work, reviews from other users, pictures, preferred language, and the like. The information may also include a guest score 311 and an experienced flag 315. The guest score 311 provides a numerical representation of the user's previous behavior as a guest and may include the number of recommendations from hosts and the number times not recommended by hosts. In some embodiments, the guest score is based on the scores (e.g., ratings) assigned by hosts from the guest's previous bookings. The experienced flag 315 shows whether the guest is a frequent user of the online booking system 111, and may be based, for example, on the total number of times a guest has booked an accommodation through the online booking system 111, the number of times a guest has used the online booking system 111 in the recent past (e.g., number of accommodations a guest has booked in the past 60 days), the length of time the guest has used the reservation system 111, or a combination of thereof.

The guest store 201 may also include guest information including whether the guest is an active host, whether is guest is verified, whether the guest has a profile picture, and other guest profile metric such as the number of words in the guest profile description. Additionally, the information may include whether the guest profile picture has a face, the average first contact message length, the guest's residence city, a price percentile by market for the guest, the number of reviews the guest has left for hosts, the types of reviews the guest leaves for hosts, the number of guest verification methods, and the types of guest verification methods. The types of guest verification methods include offline identifications, social network profiles, social network contacts or friends, phone number, date of birth, email, Government issued ID, school profile, and work profile.

The guest store 201 may further include guest booking history including the price for prior bookings, the breakdown of the price paid for prior bookings (e.g., base fee and extra fees like cleaning fees), the number of people booking, the number of completed bookings, the number of bookings made but cancelled, the number of current bookings for trips in the future, the number of messages per booking, and the number of messages per inquiry or request to book. The guest store 201 may also include guest side channel information including the number of inquiries the guest has made, the number of bookings, the number of contact inquiries, the number of contact acceptances, the number of contact bookings, the number of contact rejections, the number of instant bookings, the inquiry-to-check-in time, and the number of booked nights. guest-to-listing-host contact channels are (1) contact host and (2) request to book.

The host store 203 persistently stores data describing users, herein "hosts," that provided or are willing to provide accommodation to other users of the online booking system 111, and is one means for performing this function. Each host is represented by host object 303, which may also be called a host profile. Information about hosts include personal information such as name, user name, email address, location, phone number, gender, date of birth, personal description, education, work, reviews from other users, pictures, and the like. Furthermore, the host store 203 may store additional information such as host score 331, outstanding messages 333, past guests 335, number of declines 337, and time length 339. Each host object 303 is associated with one or more listings 305, and with one or more guest objects 301. Each host is assigned a unique host ID.

The host score 331 provides a numerical representation of the user's previous behavior as a host. The host score can be based on the rating assigned by guests from the host's previous bookings. Generally, each time a guest who books an accommodation from a host can provide a rating of the host as well as the accommodation. The ratings are then aggregated into a host score. The ratings can be weighted according to the guests' own scores 311, as well as decayed based on the age of the rating (i.e., how old the rating is).

A host can also use the online booking system 111 to request accommodations from other hosts, hence becoming a guest. In this case, the user will have a profile entry in both the guest store 201 and the host store 203. Embodiments of the online booking system 111 may combine the guest store 201 and the host store 203 into a single user profile store. The user profile store will then store the personal information as well as any guest related information and host related information if applicable. This scheme reduces the amount of redundant information between the guest store 201 and the host store 203 when a user utilizes the online booking system to both offer accommodation and reservation request accommodation.

The online booking system 111 enables, via the messaging module 227, guests and hosts to send messages to each other regarding accommodations. Outstanding messages 333 counts the number of messages from guests that the host has not responded to (i.e., number of messages waiting for a response). Outstanding messages 333 measures the responsiveness of a host to guests' reservation requests.

Past guests 335 counts the number of guests the host has accommodated. One embodiment counts the total number of guests a host has accommodated since the host started using the online booking system 111. Another embodiment only considers the number of guests a host has accommodated in the recent past (e.g., in the past 30 days).

Number of declines 337 counts the number of times the host has rejected a reservation request from a potential guest. A host may decline a reservation request for any number of reasons. For example, a reservation request from a guest for a particular accommodation may not have met been for a sufficient number of nights; or the accommodation was not in fact available and the host did not update the listing's calendar, as further described below.

Time length 339 measures the amount of time the host has been offering accommodation through the online booking system 111.

The host store 203 may also include host side channel information including the number of inquiries made, the number of bookings, the number of contact inquiries, the number of contact acceptances, the number of contact bookings, the number of contact rejections, the number of instant bookings, the inquiry-to-check-in time, and the number of booked nights. The host store 203 may also include information about request to book acceptance scores (including by new guest versus old guest), request to book acceptance rate for stays based on time to booking (some host do not like bookings far in advance), a minimum stay requirement for the listing, whether the listing business ready or not, request to book acceptance rate by duration, and request to book acceptance rate for domestic/international inquirers.

The listing store 205 stores information about the accommodations offered by hosts through listings, and is one means for performing this function. Each offering of a given accommodation is represented by listing object 305. Information about a listing includes the location 351, price 353, unit type 355, amenities 357, and calendar 359. The listing store 205 may contain additional information such as a short description of the accommodation, a list of house rules, photographs, etc. Each listing 305 is assigned a unique listing ID. Each listing 305 is associated with a single host object 303.

Location 351 identifies the geographic location of the accommodation, such as the complete address, neighborhood, city, and/or country of the accommodation offered.

Price 353 is the amount of money a guest needs to pay in order to obtain the listed accommodation. The price 353 may be specified as an amount of money per day, per week, per day, per month, and/or per season, or other period of time specified by the host. Additionally, price 353 may include additional charges such as cleaning fee, pet fee, and service fees.

Unit type 355 describes the type of accommodation being offered by the host. Embodiments classify unit type into two groups, room type and property type. Types of room include entire home or apartment, private room, and shared room. Types of property include apartment, house, bed & breakfast, cabin, villa, castle, dorm, treehouse, boat, plane, parking space, car, van, camper or recreational vehicle, igloo, lighthouse, yurt, tipi, cave, island, chalet, earth house, hut, train, tent, loft, and the like. In addition to unit type 355, the listing store 205 may include guest gender preferences for the listing.

Amenities 357 list the additional features that an accommodation offers. Amenities include smoking allowed, pets allowed, TV, cable TV, internet, wireless internet, air conditioning, heating, elevator, handicap accessible, pool, kitchen, free parking on premise, doorman, gym, hot tub, indoor fireplace, buzzer or wireless intercom, breakfast, family or kid friendly, suitable for events, washer, drier, and the like.

The host calendar 359 stores the availability of the accommodation for each date in a date period, as specified by the host or determined automatically (e.g., through a calendar import process). That is, a host accesses the host calendar 359 for a listing, and manually indicates which dates that the listing is or is not available. The host calendar 359 also includes information about the dates that the accommodation is unavailable because it has already been booked by a guest. In addition, the host calendar 359 continues to store historical information as to the availability of the accommodation. Further, the host calendar 359 may include calendar rules, e.g., the minimum and maximum number of nights allowed.

The listing store 205 may also include listing side channel information including the number of inquiries made, the number of bookings, the number of contact inquiries, the number of contact acceptances, the number of contact bookings, the number of contact rejections, the number of instant bookings, the inquiry-to-check-in time, and the number of booked nights. The listing store 203 may also include information about request to book acceptance scores (including by new guest versus old guest), request to book acceptance rate for stays based on time to booking (some host do not like bookings far in advance), a minimum stay requirement for the listing, whether the listing business ready or not, request to book acceptance rate by duration, and request to book acceptance rate for domestic/international inquirers.

The listing store 205 may also store information about dates already rejected by the host. For example, the listing store 205 may store all the check-in/checkout dates for request to book rejections. It was found that if a new query date range overlaps or sits close to dates of prior rejections, it is very likely to get rejected as well. In one embodiment, the availability module 223 is configured to crawl other unique listing accommodation sites to check whether a listing is cross listed on other sites and to examine the availability calendar for the listing on those other sites. The availability module 223 is configured to gather the listing availability form those other sites and to provide that information to the listing store 205 and/or the master calendar 211 for use in modeling the booking probability of the listing. Further, the availability module 223 is configured to determine if a listing is a subset of another listing (e.g., one listing for a whole property and another listing for one or more individual rooms in the house). The availability module 223 is also configured to gather the calendar availability information for the related listings (set-to-subset and/or subset-to-set) and to provide that information to the listing store 205 and/or the master calendar 211 for use in modeling the booking probability of the listing.

The reservation request store 213 stores reservation requests made by guests, and is one means for performing this function. Each reservation request is represented by reservation request object 307. Information stored about reservation requests include reservation request date 371, check-in date 373, number of nights 375, day of the week for check in 377, day of the week for check out 379, holidays 381, and number of guests 383. Each reservation request 307 is assigned a unique reservation request ID. A given reservation request 307 is associated with an individual guest 301 and listing 305.

Reservation request date 371 specifies the date the reservation request was made. Check-in date 373 is the first day that accommodation is needed by the inquiring guest. Number of nights 375 specifies the number of nights the accommodation is needed by the guest. Check in day 377 and check out day 379 specify the day of the week (i.e. Monday, Tuesday, Wednesday, etc.) that check in or check out is required. This information does not need to be provided by the guest since it can be inferred from the check-in date 373 and the number of nights 375. This information is important since some hosts prefer or allow for only check in and/or check out in specific days of the week (e.g., only on weekdays or only on weekends). Holidays 381 indicates the dates (if any) of holidays within the inquired accommodation period. Number of guests 383 stipulates the total number of people that are staying in the accommodation.

Reservation requests 307 can be accepted or rejected by the host 303 of the listing 305 with which the reservation request 307 is associated, and the accepted flag 385 indicates whether the reservation request 307 was accepted or rejected by the host 303. Reservation requests 307 can also expire if they are not accepted by the host 303 of the listing 305 within a threshold amount of time. In some embodiments, the expiration time of reservation requests 307 is set by the online booking system 111 (e.g., reservation requests 307 expire if they are not accepted within 24 hours since the time the reservation request 307 was submitted). In other embodiments, the expiration time of reservation requests 307 can be specified by the host 303 or the guest 301. In yet other embodiments, reservation requests 307 may expire if they are not accepted a threshold amount of time prior to the date 373 the accommodation was inquired for (e.g., reservation requests 307 may expire if they are not accepted two days before the day the check-in date 373).

The message store 209 stores all the communications between hosts 103 and guests 101, as exchanged via the messages module 227, and is one means for performing this function. Each message is associated with a guest 101, a host 103 and a listing 107. Guest may contact one or more hosts to obtain more information about their respective listings. Some guests may also use messages as a means to obtain more information about the hosts and vice versa.

Additionally, the online booking system 111 may assign scores to hosts and guests based on their responsiveness to incoming messages. Every host and guest may be assigned a response rate score based on the percentage of messages they reply to. Also, users may be assigned a response time score based on the time average time it takes for them to respond to incoming messages.

The master calendar 211 stores information indicating the availability of every listing in the listings store 205, and is one means for performing this function. Each host is responsible for updating the listing calendar 359 for every listing they post in the online booking system 111. This information is used to form the master calendar 211.

The search module 217 receives an input query from a guest and returns a list of accommodation listings that best match the input query, and is one means for performing this function. The search query includes search parameters regarding the guest's trip, such as location (e.g., postal code, city name, and country), check in date, check out date, number of guests, and the like; and the guest's accommodations preferences, such as room type, price range, amenities, and the like. The search module then retrieves all the listings that match the search query. In one embodiment, Boolean matching is used for parameters such as location and date, room type and price range, with additional parameters used to further filter the results.

In some embodiments, the search module 217 ranks the returned search results based on a ranking score. The ranking score is a function of a number of factors, such as price, host rating, distance from preferred location, listing, or a combination thereof. The ranking function can be implemented as a linear combination or a multiplicative combination of the individual factors, where each factor is represented as a scaled variable indicating a degree of match (e.g., 1 of an exact match of the underlying search parameter, 0.5 for a partial or near match), and weighted with a weight to reflect the importance of the factor. Typically, location and date are highly weighted, and amenities are lesser weighted, but the particular weights are a design decision for the system administrator. In one embodiment, the ranking factors include information provided by the availability module 223 and the acceptance module 221, as further described below.

The acceptance module 221 calculates the probability of acceptance (PC) of a reservation request by a particular guest for a particular listing by the host, and is one means for performing this function. Embodiments of the acceptance module 221 use an acceptance model for each host, based on reservation requests for listings that the host has accepted and rejected historically. For given listing that satisfies a user search, the acceptance module 221 calculates the probability that if a reservation request for the given listing is made by that guest, the host will accept that reservation request. The search module 217 can use the probability of acceptance as a ranking factor, when ranking the search results or to filter listings with a probability of acceptance lower than a threshold score. Generally, the search module 217 ranks more highly listings that have a high probability of being accepted by the host, and ranks more lowly listings that have a low probability of being accepted.

The booking module 215 allows guests 301 to reserve an accommodation offered through a listing 305, and is one means for performing this function. In operation, the booking module 215 receives a reservation request 307 from a guest 301 to reserve an accommodation offered by a particular listing 305. The reservation request includes reservation parameters, much like the search parameters in a search query, including check in date, check out date, and the number of guests. The booking module 215 presents the reservation request including the reservation parameters to the host 303 associated with the listing 305, and the host 303 may either accept or reject the reservation request. If the host 303 accepts the reservation request, then the booking module 215 updates the accepted flag 485 to indicate that the reservation request was accepted and also updates the booking store 207 and flags the booked days for the listing as unavailable upon a host accepting a guest's reservation request. The booking store 207 stores information about all the accepted and subsequently booked accommodation reservation requests. Each entry in the booking store 207 is associated with a host 303, a guest 301 and a listing 305.

Modeling Booking Conversion

For a given listing 305, patterns may emerge with regard to the types of reservation requests 307 that are accepted by the host 303 and then booked by the guest 301 as well as the types of reservation requests 307 that are rejected by the host 303 associated with the listing 305 or otherwise are not booked after a guest inquiry. The booking conversion module 229 models the booking conversion of a host 303 of a particular listing 305 based on the acceptance patterns and/or booking patterns of reservation requests for the listing 305, and is one means for performing this function. The conversion model may be listing specific. Therefore, a different booking conversion model may be generated for each listing associated with a given host in the online booking system 111. For the ease of discussion, a conversion model for a given host and listing combination is referred to hereinafter as a listing-specific conversion model. The booking conversion module 229 uses a listing-specific conversion model to estimate the probability that a new reservation request 307 for the listing 305 will be accepted by the host 303 and booked by the guest 301. In other embodiments, the conversion model is host-specific, and covers all of the listings offered by a given host; thus, there is one conversion model per host. To generate a host-specific conversion model, host-specific data, features and vectors are used instead of listing-specific data, features and vectors as described below.

Data Used to Generate Conversion Model

To generate a listing-specific conversion model, the booking conversion module 229 identifies a set of request features for classifying reservation requests. The request features may include the parameters in the guest store 201, the host store 203, the listing store 205, the booking store 207, the message store 209, the master calendar 211, and/or the reservation request store 213 described above.

In one embodiment, a request feature is binary—a reservation request either possesses the feature or does not possess the feature. Request features may be of many different types. Specifically, some request features may be related to the reservation request itself. Examples of such request features include whether the reservation request is for a given number or range of nights, whether the reservation request is for a given number or range of guests, whether the number of nights specified by the reservation request equals the maximum number of nights specified for a listing, whether the number of guests equals the maximum/minimum number of guests specified for a listing, whether the requested accommodation falls on a holiday or a weekend, whether the gap between the check-in date and a previous check-out date of a different reservation is above/below a threshold or within a range, and the day/time of day of the reservation request. In other embodiments, a request feature can be represented by a weight value that indicates the degree to which the reservation request has the feature, to allow for partial or fuzzy matching. In another embodiment, a request feature is a numeric variable representing, for example, the number of nights.

Further, some request features may be related to the guest from whom the reservation request was received or the host associated with the listing. Examples of request features related to the guest include whether the guest is experienced, whether the score of the guest is above/below a threshold, whether the guest has been verified, and whether the guest has a picture associated with his/her profile. Examples of request features related to the host include whether the host was previously contacted by the guest, whether the host replied to the guest, whether the host has outstanding messages, the number of inquiries from guests to the host of the listing, the number of bookings of the listing in the range, the number of rejections within the range, the number of contact inquiries, the number of contact acceptances, the number of contact bookings, the number of contact rejections, and the number of booked nights, the number of instant bookings in the range, the average time (e.g., in lead days) from inquiry to check-in, and the number of nights booked. In one embodiment, a channel feature is binary—the channel feature is either positive for booking or negative for booking. Persons skilled in the art will recognize that other request features not explicitly listed above are within the scope here.

The booking conversion module 229 generates a feature vector for each reservation request based on the identified set of request features and the historical data stored in the guest store 201, host store 203, listing store 205, message store 209, and reservation request store 213. For a given reservation request, the feature vector may include a binary value for each request feature, forming a bit vector. If the reservation request possesses the feature, then the binary value indicates a "1" or a "true." Conversely, if the reservation request does not possess the feature, then the binary value indicates a "0" or a "false." For the remainder of this discussion, a request feature is also referred to as $f_x$, where each x denotes a type of the request feature. For a given reservation request, then, the feature vector takes the form of: $[f_a, f_b, f_c, \ldots, f_n]$, where the binary value for each of $f_a, f_b, f_c, \ldots,$ and $f_n$ depends on whether the reservation request possesses the feature. The feature vector also includes a booking value that indicates whether the reservation request for the listing was booked by the guest. For the remainder of this discussion, the booking value feature is also referred to as A. As noted, in another embodiment, the request features can be represented by weights, to form a vector of real numbers (e.g., values between 0 and 1), or a combination of binary and real numbers.

Figure 4:
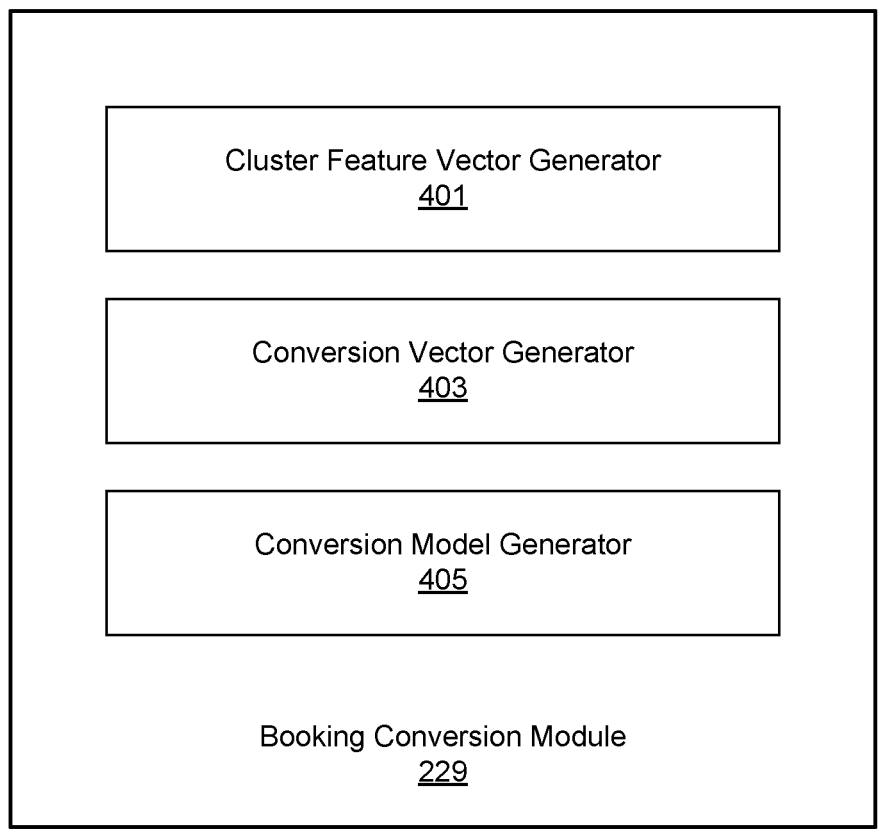
FIG. 4 is a detailed illustration of the booking conversion module 229 configured to generate a listing-specific conversion model based on regional data in accordance with one embodiment.
Figure 5:
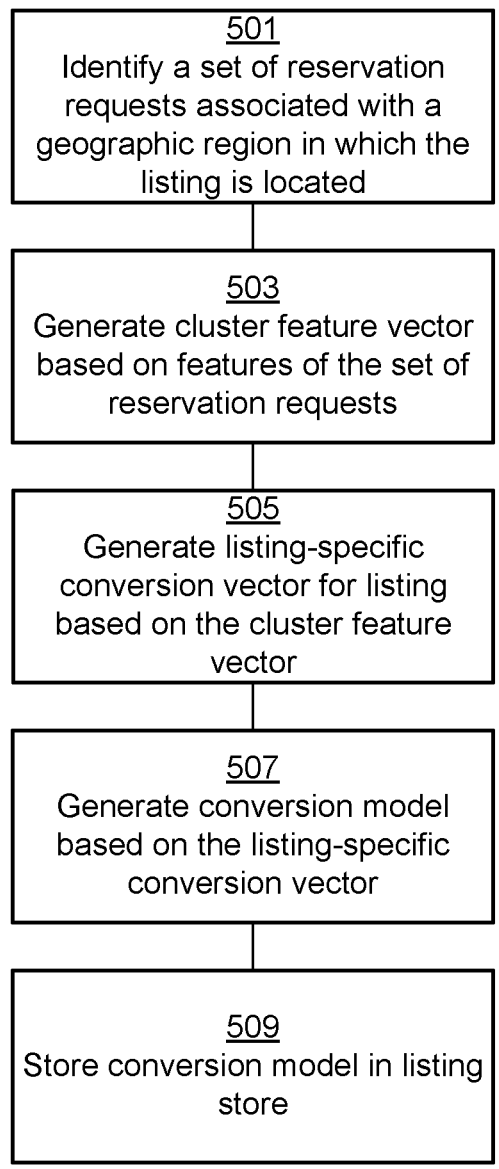
FIG. 5 is a flowchart of an exemplary method for generating a listing-specific reservation request conversion model based on regional data in accordance with one embodiment.
Figures 6A, 6B:
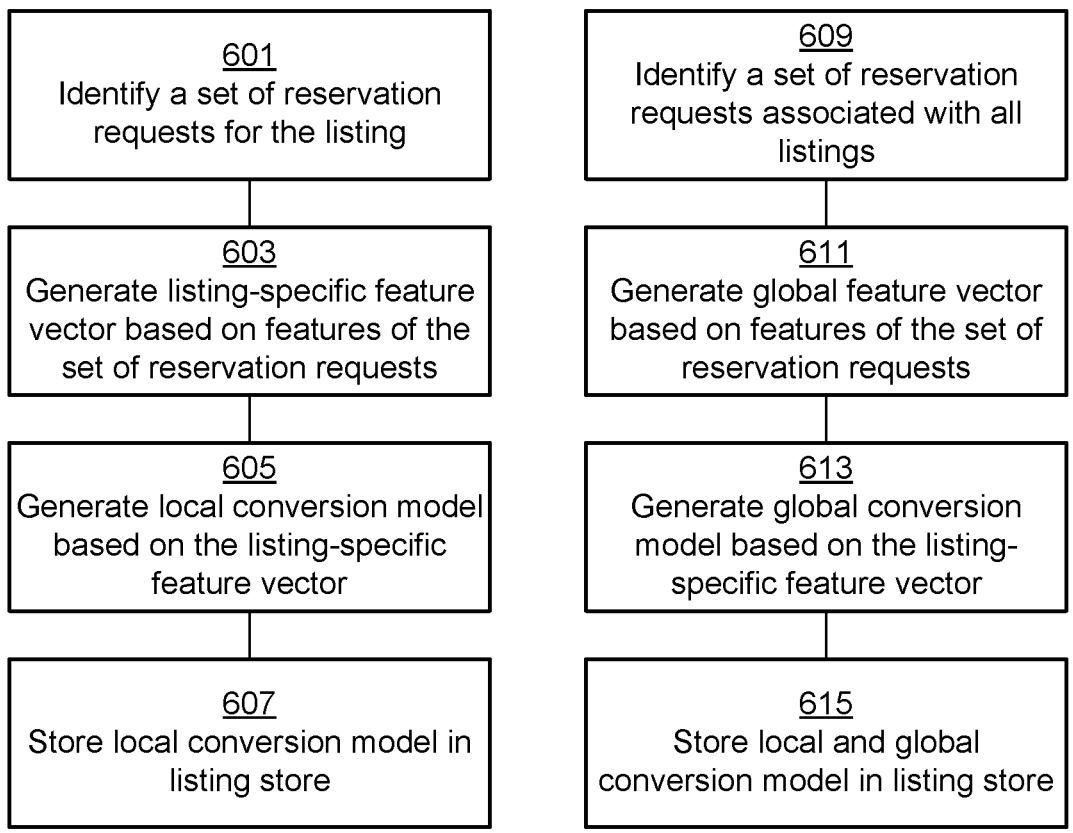
FIG. 6A is a flowchart of an exemplary method for generating a local conversion model for a listing based on data associated with the listing in accordance with one embodiment.
FIG. 6B is a flowchart of an exemplary method for generating a global conversion model based on global data in accordance with one embodiment.
Figure 7:
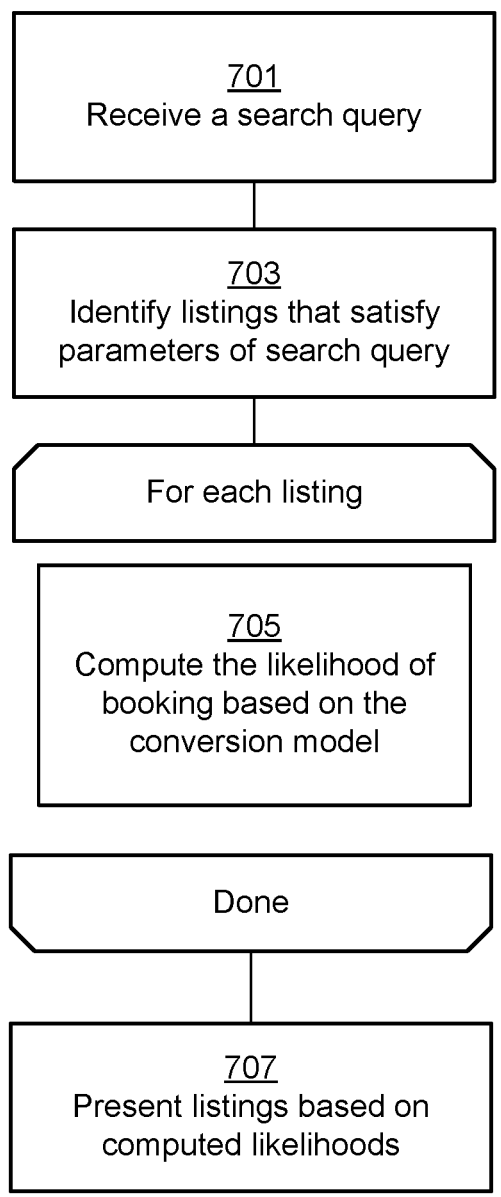
FIG. 7 is a flowchart of an exemplary method for generating search results for a search query based on conversion models in accordance with one embodiment.

Often there is insufficient historical data available to create an accurate listing-specific conversion model. To address this insufficiency of data, two different approaches may be taken by the booking conversion module 229. In the first approach, the historical data for a first listing is augmented with historical data for other listings having one or more common attributes with the first listing (referred to herein as the "cluster approach"). FIG. 4 and FIG. 5 and the corresponding description include details of the cluster approach. In the second approach, historical data for all listings are used (referred to herein as the "individual approach"). FIG. 6 and the corresponding description include details of the individual approach. With both approaches, the conversion model that is generated allows the booking conversion module 229 to estimate the probability that a future reservation request for the listing will be booked by a guest. FIG. 7 and the corresponding description include details of using a conversion model to improve search results presented to a prospective guest.

Cluster Approach to Generating a Conversion Model

In the cluster approach, the booking conversion module 229 generates the listing-specific conversion model based on a cluster of reservation requests. The cluster includes reservation requests for the listing as well as reservation requests for other listings having one or more attributes in common with the listing. The attribute may be the listings being in the same geographic region, having the same type (e.g., room type), having the same type of host (e.g., property manager), or may be based on collaborative filtering. Training the model based on cluster data, as opposed to data associated with only the listing, enables the booking conversion module 229 to generate an accurate model when the data associated with the listing is insufficient.

The following discussion describes the process for generating a listing-specific conversion model for a cluster of reservation requests for listings in the same region. Persons skilled in the art would readily understand that the described process may be used to generate a listing-specific conversion model for a cluster of reservation requests for listings having one or more different common attributes, such as having the same listing type or host type.

FIG. 4 is a detailed illustration of the booking conversion module 229 configured to generate a listing-specific conversion model based on cluster data in accordance with one embodiment. As shown, the booking conversion module 229 includes a cluster feature vector generator 401, a conversion vector generator 403, and a conversion relevance generator 405. The functional details of these components are discussed below with reference to generating a listing-specific conversion model for listing L located in region G and hosted by host H.

The cluster feature vector generator 401 (also "generator 401") generates a cluster feature vector for a collection of previously received reservation requests for listings included in a particular cluster, and is one means for performing this function. In operation, for listing L, the generator 401 identifies the geographic region G within which the listing L is located. A geographic region may be a neighborhood, zip code, city, county, a country, or any arbitrary geographic area determined by the booking conversion module 229. The generator 401 identifies a collection of previously received reservation requests for listing L as well as reservation requests for other listings in region G. In one embodiment, reservation requests for only a subset of all the other listings in region G are selected. The subset of listings may be selected arbitrarily or based on a similarity between listing L and the subset of the other listings. For example, the subset may be those listings having the same unit type as listing L and within region G. Further, only a subset of reservation requests for a given listing may be selected for the set of reservation requests. For example, only those reservation requests made within a particular time period, such as the last six months, may be selected.

The generator 401 generates a feature vector for each reservation request in the set of reservation requests. As discussed above, for a given set of request features, a feature vector identifies whether the reservation request possesses each of the request features. The many different types of request features are listed above, but assume for sake of example that the feature vectors generated by the generator 401 include four features $f_a$, $f_b$, $f_c$, and $f_d$, and the booking value B. In this example, the value off, indicates whether the requested accommodation fell on a weekend/holiday. The value of $f_b$ indicates whether the requested accommodation was for the maximum number of nights offered for the listing. The value of $f_c$ indicates whether the check-in date for the requested accommodation was at least 1 full day after the check-out date for a previous booking. The value of $f_d$ indicates whether the host had previously been contacted by the guest. The value of B indicates whether the guest booked or did not book the reservation request.

For each feature vector, the generator 401 accesses the relevant store(s) in the online booking system 111 that store data enabling the generator 401 to determine whether the associated reservation request possesses each request feature. For example, for $f_a$, the generator 401 accesses the reservation request store 312 to determine the specifics dates for which the reservation request was made. If the dates fell on a weekend/holiday, then $f_a$ is set to "1." If the dates did not fall on a weekend/holiday, then $f_a$ is set to "0." Similarly, for $f_b$, the generator 401 accesses the reservation request store 312 to determine the number of nights for which the reservation request was made. The generator 401 also accesses the listing store 205 to determine the maximum number of nights specified for the listing. In the numbers match, then $f_b$ is set to "1." If the numbers do not match, then $f_b$ is set to "0." In such a manner, the generator 401 accesses the data in the different stores to fill in the feature vector for each of the set of reservation requests.

The generator 401 then combines the individual feature vectors for the set of reservation requests to generate a cluster feature vector that represents the set of reservation requests. For example, if there are three listings including listing L in the region G, then the feature vectors of reservation requests for the three listings are combined to generate the cluster feature vector. Assume that, in such an example, five reservation requests have been made for the three listings. The cluster feature vector may then take the form of:

$$\begin{pmatrix} f_a & f_b & f_c & f_d & B \\ 1 & 0 & 1 & 1 & 0 \\ 0 & 0 & 0 & 1 & 0 \\ 1 & 0 & 0 & 1 & 1 \\ 1 & 1 & 1 & 0 & 1 \\ 0 & 1 & 1 & 1 & 0 \end{pmatrix}$$

where each column of the vector corresponds to one of $f_a, f_b, f_c, f_d$, and B, and each row corresponds to a different reservation request for one of the three listings. In this example, the first two rows may correspond to reservation request 1 and reservation request 2 for listing L, rows three and four may correspond to reservation request 1 and reservation request 2 for listing M in region G, and the last row may correspond to reservation request 1 for listing N in region G.

The conversion vector generator 403 (also "generator 403") processes the cluster feature vector to generate a listing-specific conversion vector, and is one means for performing this function. The listing-specific conversion vector identifies a conversion value of a particular listing for each request feature. The conversion vector takes the form of: $[\beta_{1a}, \beta_{1b}, \beta_{1c}, \ldots, \beta_{1n}]$.

To compute the listing-specific conversion vector, the generator 403 first computes a cluster conversion value for each request feature in the cluster feature vector. A cluster conversion value for a given request feature combines the conversion of all listings in the cluster, e.g., listings in the same region, by computing the average or median of the conversion across all listings or reservation requests represented by the cluster feature vector. In one embodiment, a cluster conversion value is computed using the following formula:

$$\beta_x = \frac{\sum_{i=1}^{T} f_x \times B}{\sum_{i=1}^{T} f_x}$$

where $\beta_x$ is the cluster conversion value for a given request feature, T is the total number of reservation requests represented by the cluster feature vector, $f_x$ is the value of the request feature for a given reservation request represented by the cluster feature vector, and B is the value that indicates whether or not the reservation request was booked by the guest.

Continuing the example above with reservation requests for listings L-N, the cluster conversion value $\beta_a$ for request feature $f_a$ can be computed by evaluating the following equation. When evaluated, the value of $\beta_a$ is ~0.67.

$$\beta_a = \frac{\sum_{i=1}^{5} f_a \times B}{\sum_{i=1}^{5} f_x}$$

Once the cluster conversion values are computed for each of the request features, the generator 403 can compute the listing-specific conversion vector for the particular listing. Again, the listing-specific conversion vector identifies a conversion value of a host of a particular listing for each request feature. In operation, the generator 403 computes a listing-specific conversion value for each request feature based on a combination of the cluster conversion value and a local conversion value for the feature. The local conversion value for a given request feature indicates the median or mean conversion for the request feature across all reservation requests for the particular listing. In one embodiment, a local conversion value is computed using the following formula:

$$\beta_{lx} = \frac{\sum_{i=1}^{Y_l} f_x \times B + k\beta_x}{\sum_{i=1}^{Y_l} f_x + k}$$

where $\beta_{lx}$ is the listing-specific conversion value for a given request feature, $Y_l$ is the total number of reservation requests represented in the cluster feature vector for the listing l, $f_x$ is the value of the request feature for a given reservation request represented in the cluster feature vector, B is indicating whether the reservation request was booked or not by the guest, and k is a weight to be assigned to the cluster conversion value for the request feature.

Continuing the example above with reservation requests for listings L-N, the listing-specific conversion value $\beta_{la}$ for request feature $f_a$ can be computed by evaluating the following equation. In the equation below, the weight k is set to 0.5. Any other suitable weight is within the scope. When evaluated, the value of $\beta_{la}$ is ~0.13.

$$\beta_{la} = \frac{\sum_{i=1}^{2} f_a \times B + 0.5 \times 0.67}{2 + 0.5}$$

As discussed above, the listing-specific conversion values $[\beta_{la}, \beta_{lb}, \beta_{lc}, \ldots, \beta_{ln}]$ form the listing-specific conversion vector. The conversion model generator 405 (also the "generator 405") generates the listing-specific conversion model for a listing based on the listing-specific conversion vector, and is one means for performing this function. To generate the model, the generator 405 first generates the training data set for the model. The training data set is generated by applying the listing-specific conversion vector to the feature vectors of the reservation requests for the listing represented by the cluster feature vector. Specifically, for a given feature vector, the value of each request feature is multiplied by the listing-specific conversion value for that request feature to generate a conversion score. The collection of resulting feature vectors form the training data set for the model.

The generator 405 next estimates based on the training data set the effect of each conversion on whether a guest ultimately books a requested reservation. The estimated effect of each conversion is a parameter of the conversion model, and the collection of the parameters form the conversion model. In one embodiment, the generator 405 computes the parameters of the conversion model using a logistic regression that identifies the statistical relationship between the booking or not booking of a reservation request as represented by B and the request features. Specifically, the generator 405 sets up an equation associated with each reservation request represented by the cluster feature vector. Each equation takes the form of:

$$B = \theta_o + [\theta_a \times \beta_{la} \cdot f_a] + [\theta_b \times \beta_{lb} \cdot f_b] + [\theta_c \times \beta_{lc} \cdot f_c] + [\theta_d \times \beta_{ld} \cdot f_d]$$

where B is the value indicating whether the reservation request was booked or not, $\theta_o$ is a constant parameter of the parameter model, $\theta_a$ is a parameter of the parameter model that indicates the statistical relationship between $f_a$ and B, $\beta_{la} \cdot f_a$ is the conversion score for request feature $f_a$ in the training data set, $\theta_b$ is a parameter of the parameter model that indicates the statistical relationship between $f_b$ and B, $\beta_{lb} \cdot f_b$ is the conversion score for request feature $f_b$ in the training data set, $\theta_c$ is a parameter of the parameter model that indicates the statistical relationship between $f_c$ and B, $\beta_{lc} \cdot f_c$ is the conversion score for request feature $f_c$ in the training data set, and $\theta_d$ is a parameter of the parameter model that indicates the statistical relationship between $f_d$ and B, $\beta_{ld} \cdot f_d$ is the conversion score for request feature $f_d$ in the training data set.

The generator 405 then processes the equations to estimate values for the parameters: $\theta_o$, $\theta_a$, $\theta_b$, $\theta_c$, and $\theta_d$. Collectively, the parameters form the conversion model associated with the collection of listings included in the region. The conversion model can be used to estimate the probability that a future reservation request for the listing will result in the guest booking the listing. As discussed in detail in conjunction with FIG. 7 below, such a probability can be used to filter search results for listings.

FIG. 5 is a flowchart of an exemplary method for generating a listing-specific reservation request conversion model based on regional data in accordance with one embodiment. The method in FIG. 5 is described in the context of generating the conversion model for listing L. The method begins with the booking conversion module 229 identifying 501 a set of reservation requests for listings, including listing L, in the geographic area in which listing L is located. Each reservation request has previously been booked or not by the guest associated with the reservation request.

The booking conversion module 229 generates 503 a cluster feature vector based on features of the identified set of reservation requests. Specifically, the booking conversion module 229 first generates a feature vector for each of the set of reservation requests. Each feature vector indicating whether or not the reservation request possesses each of a set of request features. The feature vectors for the set of reservation requests collectively form the cluster feature vector.

The booking conversion module 229 generates 505 a listing-specific conversion vector for listing L based on the generated cluster feature vector. The listing-specific conversion vector includes a conversion value of the host of listing L for each request feature. To generate the listing-specific conversion vector, the booking conversion module 229 first computes a regional median or mean conversion for each request feature across all listings represented by the cluster feature vector. The regional median or mean conversion is combined with the host's conversion for the request feature to compute the conversion value of the host of listing L for the request feature.

Based on the listing-specific conversion vector, the booking conversion module 229 generates 507 the conversion model for the region to which listing L belongs. The conversion model indicates the statistical relationship between the booking of a reservation request and each request feature. To determine the model, the generator 405 first generates the training data set for the model. The training data set is generated by applying the listing-specific conversion vector to the feature vectors of the reservation requests for listings in the region. The booking conversion module 229 then estimates based on the training data set the statistical relationship between the booking of a reservation request, each request feature, and the host/listing conversions. The estimated statistical relationship is a parameter of the conversion model, and the collection of the parameters form the conversion model.

The booking conversion module 229 stores 509 the conversion model in the model store 231 in association with the region to which the listings belong. The conversion model may be updated periodically based on data associated with new reservation requests for listing L and/or the other listings in the region.

Individual Approach to Generating a Conversion Model

In the individual approach, the booking conversion module 229 generates two conversion models: (i) a local conversion model generated based on reservation requests for the listing, and (ii) a global conversion model generated based on reservation requests across all listings available in the online booking system 111. FIG. 6A describes the process for generating the local conversion model, and FIG. 6B describes the process for generating the global conversion model. When the data associated with the listing is sufficient to generate an accurate model, the local conversion model is used to predict the probability of a future reservation request for the listing being booked. When the data associated with the listing is insufficient, the global conversion model is used to predict the probability for the future reservation request being booked.

FIG. 6A is a flowchart of an exemplary method for generating a local conversion model for a listing based on data associated with the listing in accordance with one embodiment. The method in FIG. 6A is described in the context of generating the conversion model for listing L. The method begins with the booking conversion module 229 identifying 501 a set of reservation requests for the listing L. Each reservation request ended up being booked or not (e.g., through action or inaction of the host and/or guest).

The booking conversion module 229 generates 603 a listing-specific feature vector based on features of the identified set of reservation requests. The listing-specific feature vector includes a vector for each of the set of reservation requests. For a given reservation request, a feature vector identifies whether the reservation request possesses each of a set of request features. Let's assume that the feature vectors generated by the generator 401 include four features $f_a, f_b, f_c,$ and $f_d$, and the booking value B. The booking conversion module 229 combines the individual feature vectors for the set of reservation requests to generate the listing-specific feature vector that represents the set of reservation requests. For example, assume that five reservation requests have been made for listing L. The listing-specific feature vector for listing L may then take the form of:

$$\begin{pmatrix} f_a & f_b & f_c & f_d & B \\ 0 & 0 & 0 & 1 & 1 \\ 1 & 0 & 1 & 0 & 0 \\ 1 & 0 & 0 & 1 & 1 \\ 1 & 0 & 1 & 0 & 1 \\ 0 & 1 & 1 & 1 & 0 \end{pmatrix}$$

where each column of the vector corresponds to one of $f_a, f_b, f_c, f_d$, and B, and each row corresponds to a different reservation request for listing L.

Based on the listing-specific feature vector, the booking conversion module 229 generates 607 a local conversion model for listing L. The local conversion model indicates the statistical relationship between the booking of a reservation request for listing L and each request feature. The training data set for the local conversion model is generated based on the listing-specific feature vector. The booking conversion module 229 estimates based on the training data set the statistical relationship between the booking of a reservation request and each request feature. The estimated statistical relationship of each request feature is a parameter of the conversion model, and the collection of the parameters form the conversion model.

The booking conversion module 229 computes the parameters of the local conversion model by identifying the statistical relationship between the booking or not of a reservation request as represented by B and the request features. In one embodiment, the booking conversion module 229 computes the parameters of the local conversion model using a logistic regression that identifies the statistical relationship between the booking or not of a reservation request as represented by B and the request features. Specifically, the booking conversion module 229 sets up a set of equations, each equation associated with a different reservation request represented by the listing-specific feature vector for listing L. Each equation takes the form of:

$$B = \gamma_o + [\gamma_a \times f_a] + [\gamma_b \times f_b] + [\gamma_c \times f_c] + [\gamma_d \times f_d]$$

where B is the value indicating whether the reservation request was booked or not, $\gamma_o$ is a constant parameter of the parameter model, $\gamma_a$ is a parameter of the parameter model that indicates the statistical relationship between $f_a$ and B, $f_a$ is the value for request feature $f_a$ in the listing-specific feature vector, $\gamma_b$ is a parameter of the parameter model that indicates the statistical relationship between $f_b$ and B, $f_b$ is the value for request feature $f_b$ in the listing-specific feature vector, $\gamma_c$ is a parameter of the parameter model that indicates the statistical relationship between $f_c$ and B, $f_c$ is the value for request feature $f_c$ in the listing-specific feature vector, and $\gamma_d$ is a parameter of the parameter model that indicates the statistical relationship between $f_d$ and B, $f_d$ is the value for request feature $f_d$ in the listing-specific feature vector. The booking conversion module 229 then processes the equations to estimate values for the parameters: $\gamma_o, \gamma_a, \gamma_b, \gamma_c,$ and $\gamma_d$. Collectively, the parameters form the local conversion model associated with listing L. The local conversion model can be used to estimate the probability that a future reservation request for the listing will be booked by the guest who submitted the request.

The booking conversion module 229 stores 607 the local conversion model in the listing store 205 in association with listing L. The local conversion model may be updated periodically based on data associated with new reservation requests for listing L.

FIG. 6B is a flowchart of an exemplary method for generating a global conversion model based on global data in accordance with one embodiment. The method begins with the booking conversion module 229 identifying 609 a set of reservation requests associated with all the listings in the online booking system 111. Each reservation request has previously been booked or not booked by the guest who submitted the request.

The booking conversion module 229 generates 611 a global feature vector based on features of the identified set of reservation requests. The global feature vector includes a vector for each of the set of reservation requests. For a given reservation request, a feature vector identifies whether the reservation request possesses each of a set of request features. Let's assume that the feature vectors generated by the generator 401 include four features $f_a, f_b, f_c$, and $f_d$, and the booking value B. The booking conversion module 229 combines the individual feature vectors for the set of reservation requests to generate the global feature vector that represents the set of reservation requests.

Based on the global feature vector, the booking conversion module 229 generates 613 a global conversion model. The global conversion model indicates the statistical relationship between the booking of a reservation request for any listing and each request feature. The training data set for the global conversion model is generated based on the global feature vector which includes feature vectors for all reservation requests across all listings. The booking conversion module 229 estimates based on the training data set the statistical relationship between the booking of a reservation request and each request feature. The estimated statistical relationship of each request feature is a parameter of the global conversion model, and the collection of the parameters form the global conversion model.

In one embodiment, the booking conversion module 229 computes the parameters of the local conversion model using a logistic regression that identifies the statistical relationship between the booking or not booking of a reservation request as represented by B and the request features. The specifics of the logistic regression in this embodiment are the same as those discussed above with the local conversion model.

The booking conversion module 229 stores 615 the global conversion model in the listing store 205. The global conversion model may be updated periodically based on data associated with new reservation requests for the listings in the online booking system 111.

Improving Search Results with Conversion Models

Conversion models generated by booking conversion module 229 may be used by the search module 217 to improve the search results presented to a prospective guest in response to receiving a search query. Specifically, a conversion model may be used by the search module 217 to determine a probability that a reservation request for a listing associated with a search result would be accepted by the host of the listing and then booked by the guest. The search module 217 may then filter certain search results having a determined probability below a threshold function. The low-booking-probability results may otherwise cause problems for prospective guests and/or result in a bad user experience since the guests spent time searching for a listing and found a listing that appears appealing only to have the inquiry not lead to booking. Accordingly, due to the singular nature of unique accommodation searches—in which searchers routinely review all search results including demoted search results—removing these potentially-problematic listing results yields an improved user experience and increased bookings.

FIG. 7 is a flowchart of an exemplary method for generating search results for a search query based on conversion models in accordance with one embodiment. The method beings with the search module 217 receiving 701 a search query from a guest. A search query typically includes several parameters that define the scope of the query. Parameters may include the geographic region, unit type, check-in and check-out dates, and the number of guests. In response to the search query, the search module 217 identifies 703 a set of listings in the listing store 205 that satisfy the search parameters.

For each listing, the search module 217 computes 705 based on a conversion model associated with the listing the probability that a prospective reservation request for the listing, matching the parameters of the search query, from the guest would be accepted by the host of the listing and booked by the guest. The computation of the probability differs depending on whether the booking conversion module 229 is following the cluster approach or the individual approach.

In the case of the cluster approach, the search module 217 selects the conversion model stored in the conversion module store 231. The search module 217 then identifies the parameters specified in the conversion model and applies those parameters derived from the search query to the parameters derived from the search query. Specifically, the search module 217 breaks the search query into request features and applies the relevant parameter to each request feature. In one embodiment, the following equation is used to apply the parameters to the prospective reservation request:

$$L=\theta_o+[\theta_a \times \beta_{la} \cdot f_a]+[\theta_b \times \beta_{lb} \cdot f_b]+[\theta_c \times \beta_{lc} \cdot f_c]+[\theta_d \times \beta_{ld} \cdot f_d]$$

where L is the value that indicates the likelihood that the prospective reservation request will be booked, $\theta_o$ is a constant parameter of the parameter model, $\theta_a$ is a parameter of the conversion model that indicates the statistical relationship between $f_a$ and booking of the reservation request, $\beta_{la}$ the listing-specific conversion for request feature $f_a, f_a$ is the value for a request feature of the prospective reservation request, $\theta_b$ indicates the statistical relationship between a given booking conversion $\beta_{lb}$ and the booking of the reservation request, $\beta_{lb}$ is the listing-specific conversion for request feature $f_b$, $f_b$ is the value for request feature for the prospective reservation request, $\theta_c$ is a parameter of the conversion model that indicates the statistical relationship between $f_c$ and booking of the reservation request, $\beta_{lc}$ is the listing-specific conversion for request feature $f_c$, $f_c$ is the value for request feature for the prospective reservation request, $\theta_d$ is a parameter of the conversion model that indicates the statistical relationship between $f_d$ and booking of the reservation request, $\beta_{ld}$ is the listing-specific conversion for request feature $f_d$, and $f_d$ is the value for request feature for the prospective reservation request.

In one embodiment, L from the equation above, i.e., the likelihood that the prospective reservation request will be booked, is transformed into a probability using the following logistic formula:

$$\frac{1}{(1+e^{-L})}$$

In the case of the booking conversion module 229 following the individual approach, the search module 217 selects between the global conversion model and the local conversion model stored in association with the listing. The search module 217 makes the selection based on the number of historical reservation requests received for the listing based on which the local conversion model was generated. When the number of reservation requests is below a threshold, then the search module 217 applies the parameters of the global conversion model to the prospective reservation request. When the number of reservation requests is above a threshold, the search module 217 applies the parameters of the local conversion model to the prospective reservation request. The mechanism for applying the global conversion model or the local conversion model to the prospective reservation request is the same as that discussed above with respect to the cluster approach. In one embodiment, when the number of reservation requests is above a threshold, the search module 217 computes a global probability based on the global conversion model and a local probability based on the local conversion model. The two probabilities are then combined to generate the probability of the prospective reservation request being booked.

Once the probability of a reservation request being booked is computed for the identified listings, the search module 217 presents 707 the listings to the prospective guest based on the computed probabilities. In one embodiment, the search module 217 filters the listings based on the computed probabilities. Other features, such as the quality of the listings, the price, etc., may further influence the rankings of the listings. In another embodiment, the search module 217 filters listings from being presented that have computed probabilities below a threshold function.

In one embodiment, the search module 217 filters the listings based historical booking conversion rates with a step threshold function. For example, the search module 217 may filter out listings in searches returned to a portion P of searchers if those listings have received over a target number of listings L and the conversion rate (inquiry-to-book ratio) $C_R$ is less than a threshold T. In one embodiment, the search module 217 filters out listings in searches returned to 95% of searchers if those listings receive over 20 lifetime inquiries, and the conversion rate is less than 5% (i.e., the number of bookings<the number of inquiries times 0.05). In this embodiment, the inquiry-to-book ratio of 5% was selected because to capture a large number of rejections for a small number of listings.

In another embodiment, the search module 217 filters the listings based historical booking conversion rates with a progressive threshold function. With a progressive threshold function, listings with a conversion rate $C_R$ below a lower limit $L_L$ may show up according to a lower limit function. Listings with a conversion rate $C_R$ above an upper limit $U_L$ may show up according to an upper limit function. And listings with a conversion rate $C_R$ between the lower limit and upper limit show up according to a mid-range function. In one embodiment, listings with 0.1 conversion rate or below, will show up 10% time, listings with 0.15 conversion rate or above, will show up 100% time, and listings with conversion rates $C_R$ in between 0.05 and 0.15 will be displayed (display rate $D_R$) following linear curve:

$$D_R = 0.1 + 9 \times (C_R - 0.05)$$

Sampling to determine the listings to display may be deterministic for a particular query. For example, filtering may be done at the hash visitor ID+":" +listing ID) level. Accordingly, for a given visitor ID, a listing will be hidden or shown independent of search queries.

In another embodiment, the search module 217 filters the listings based historical booking conversion rates with a progressive threshold function using an upper confidence bound (UCB). In the prior threshold functions, the conversion rate $C_R$ is calculated as:

$$C_R = \frac{(B + 1.0)}{(I + 3.0)}$$

In the above equation, B is the number of bookings for the listing and I is the number of inquiries for the listing. This mean estimation with smoothing (beta distribution) is a point estimation without a confidence interval. To be conservative, any listings with a conversion rate $C_R$ is less than a threshold T (20 lifetime inquiries in the above example) may forego filtering to account for a low confidence interval. However, at the same conversion ratio (e.g., 0.1) the models completely ignore the difference between listing with many (e.g., 200) inquiries and a listing with few (e.g., 20) inquiries.

A progressive threshold function may ameliorate this issue using a UCB. For example, a UCB conversion rate $C_{RUCB}$ may be calculated according to a formula:

$$C_{RUCB} = C_R + 2.0 \times \sqrt{\frac{C_R \times (1.0 - C_R)}{(I + 4.0)}}$$

Alternatively, the search module 217 may filter the listings based historical booking conversion rates with any combination of the above types of threshold functions. The low-booking-probability results may otherwise cause problems for prospective guests and/or result in a bad user experience since the guests spent time searching for a listing and found a listing that appears appealing only to have the inquiry not lead to booking. Accordingly, due to the singular nature of unique accommodation searches—in which searchers routinely review all search results including demoted search results—removing these potentially-problematic listing results yields an improved user experience and increased bookings.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
   identifying a plurality of listings having at least one common attribute;
   determining a set of reservation requests received for the plurality of listings, each reservation request having previously been booked or not;
   determining a cluster conversion value for a request feature based on a number of the set of reservation requests that were booked and a number of the set of reservation requests that possess the request feature;
   generating a plurality of conversion models, each conversion model corresponding to a listing of the plurality of listings, wherein generating each of the plurality of conversion models comprises:
      determining based on the cluster conversion value a listing-specific conversion value for the request feature, the listing-specific conversion value specific to the corresponding listing, and
      generating the conversion model based on the listing-specific conversion value, the conversion model identifying a relationship between the request feature and a prospective reservation request for the corresponding listing being booked or not; and
   applying the plurality of conversion models to the prospective reservation requests to compute a plurality of probabilities that the prospective reservation request will be booked by a guest, each of the plurality of probabilities specific to a listing of the plurality of listings and computed by the conversion model corresponding to the listing.

2. The method of claim 1, further comprising:
   determining that the prospective reservation request is associated with a search query received from the guest; and
   determining whether to display a listing of the plurality of the listings as a result of the search query to the guest based on the computed probability of the listing.

3. The method of claim 2, wherein determining whether to display the listing of the plurality of the listings as a result of the search query comprises:
   comparing the computed probability of the listing with a booking threshold determined by a booking threshold function; and
   displaying the listing of the plurality of the listings as a result of the search query, in response to the computed probability being equal to or above the booking threshold.

4. The method of claim 1, wherein the request feature indicates a mechanism for classifying the set of reservation requests.

5. The method of claim 1, wherein determining the listing-specific conversion value comprises:
   identifying a subset of the reservation requests that were received for the corresponding listing;
   determining a number of the subset that were booked and a number of the subset that possess the request feature; and
   determining the listing-specific value based on a combination of the cluster conversion value, the number of the subset that were booked, and the number of the subset that possess the request feature.

6. The method of claim 1, wherein generating each of the plurality of conversion models comprises generating a training data set by applying the corresponding listing-specific conversion value to a subset of the reservation requests that were received for the corresponding listing.

7. The method of claim 6, further comprising processing the training data set using a logistic regression to determine the relationship between the request feature and the prospective reservation request for the corresponding listing being booked or not by the guest.

8. The method of claim 1, wherein each of the plurality of listings is for an accommodation being offered for reservation by a host, and the request feature is a gap feature indicating a specific period of time between a first previous reservation or calendar unavailability of the accommodation ending and a reservation associated with a second previous reservation request beginning.

9. The method of claim 1, further comprising:
   determining a set of global reservation requests received for the plurality of listings, each reservation request having previously been booked or not;
   determining a global conversion value for a plurality of request features based on a number of the set of global reservation requests that were booked and a number of the set of global reservation requests that possess each request feature of the plurality of the request features; and
   generating a global conversion model based on the global conversion value, the conversion model identifying a relationship between each request feature of the plurality of request features and a prospective reservation request for a listing of the plurality of listings being booked or not by the guest.

10. The method of claim 9, further comprising:
in response to a number of the global reservation requests in the set of global reservation requests being above or equal to a threshold number, applying the conversion model corresponding to each listing of the plurality of listings to the prospective reservation request for the corresponding listing to compute a probability that the prospective reservation request will be booked or not by the guest; or
in response to the number of the global reservation requests in the set of global reservation requests being below the threshold number, applying the global conversion model to the prospective reservation request for each listing of the plurality of listings to compute the probability that the prospective reservation request will be booked or not by the guest.

11. A non-transitory computer readable medium storing instructions, the instructions when executed cause the processor to:
identify a plurality of listings having at least one common attribute;
determine a set of reservation requests received for the plurality of listings, each reservation request for a listing having previously been booked or not;
determine a cluster conversion value for a request feature based on a number of the set of reservation requests that were booked and a number of the set of reservation requests that possess the request feature;
generate a plurality of conversion models, each conversion model corresponding to a listing of the plurality of listings, wherein the instructions that cause the processor to generate each of the plurality of conversion models comprise instructions that cause the processor to:
determine based on the cluster conversion value a listing-specific conversion value for the request feature, the listing-specific conversion value specific to the corresponding listing, and
generate the conversion model based on the listing-specific conversion value, the conversion model identifying a relationship between the request feature and a prospective reservation request for the corresponding listing being booked or not; and
apply the plurality of conversion models to the prospective reservation request to compute a plurality of probabilities that the prospective reservation requests will be booked by a guest, each of the plurality of probabilities specific to a listing of the plurality of listings and computed by the conversion model corresponding to the listing.

12. The non-transitory computer readable medium of claim 11, the instructions further comprising instructions that cause the processor to:
determine that the prospective reservation request is associated with a search query received from the guest; and
determine whether to display a listing of the plurality of the listings as a result of the search query to the guest based on the computed probability of the listing.

13. The non-transitory computer readable medium of claim 12, wherein the instructions that cause the processor to determine whether to display the listing of the plurality of the listings as a result of the search query comprise instructions that cause the processor to:
compare the computed probability of the listing with a booking threshold determined by a booking threshold function; and
display the listing of the plurality of the listings as a result of the search query, in response to the computed probability being equal to or above the booking threshold.

14. The non-transitory computer readable medium of claim 11, wherein the request feature indicates a mechanism for classifying the set of reservation requests.

15. The non-transitory computer readable medium of claim 11, wherein the instructions that cause the processor to determine the listing-specific conversion value comprise instructions that cause the processor to:
identify a subset of the reservation requests that were received for the corresponding listing;
determine a number of the subset that were booked and a number of the subset that possess the request feature; and
determine the listing-specific value based on a combination of the cluster conversion value, the number of the subset that were booked and the number of the subset that possess the request feature.

16. The non-transitory computer readable medium of claim 11, wherein the instructions that cause the processor to generate each of the plurality of conversion models comprise instructions that cause the processor to generate a training data set by applying the corresponding listing-specific conversion value to a subset of the reservation requests that were received for the corresponding listing.

17. The non-transitory computer readable medium of claim 16, wherein the instructions that cause the processor to generate each of the plurality of conversion models further comprise instructions that cause the processor to process the training data set using a logistic regression to determine the relationship between the request feature and the prospective reservation request for the corresponding listing being booked or not by the guest.

18. The non-transitory computer readable medium of claim 11, wherein each of the plurality of listings is for an accommodation being offered for reservation by a host, and the request feature is a gap feature indicating a specific period of time between a previous reservation or calendar unavailability of the accommodation ending and a reservation associated with a reservation request beginning.

19. A computer system comprising:
a processor; and
a memory storing instructions that, when executed by the processor, cause the processor to:
identify a plurality of listings having at least one common attribute;
determine a set of reservation requests received for the plurality of listings, each reservation request for a listing having previously been booked or not;
determine a cluster conversion value for a request feature based on a number of the set of reservation requests that were booked and a number of the set of reservation requests that possess the request feature;
generate a plurality of conversion models, each conversion model corresponding to a listing of the plurality of listings, wherein the instructions that cause the processor to generate each of the plurality of conversion models comprise instructions that cause the processor to:
determine based on the cluster conversion value a listing-specific conversion value for the request feature, the listing-specific conversion value specific to the corresponding listing, and
generate the conversion model based on the listing-specific conversion value, the conversion model identifying a relationship between the request feature and a prospective reservation request for the corresponding listing being booked or not; and
apply the plurality of conversion models to the prospective reservation requests to compute a plurality of probabilities that the prospective reservation request will be booked by a guest, each of the plurality of probabilities specific to a listing of the plurality of listings and computed by the conversion model corresponding to the listing.

\* \* \* \* \*